Patented Sept. 9, 1930

1,775,175

UNITED STATES PATENT OFFICE

OTTO SCHMIDT AND KARL SEYDEL, OF LUDWIGSHAFEN-ON-THE-RHINE, AND EGON MEYER, OF MANNHEIM, GERMANY, ASSIGNORS TO I. G. FARBENINDUSTRIE AKTIEN-GESELLSCHAFT, OF FRANKFORT-ON-THE-MAIN, GERMANY, A CORPORATION OF GERMANY

PRODUCTION OF ARTIFICIAL MASSES FROM CASEIN

No Drawing. Application filed September 12, 1927, Serial No. 219,172, and in Germany August 27, 1926.

We have found that a superior kind of artificial horn may be produced from casein by incorporation therewith of liquid or solid hydroaromatic or aliphatic-hydroaromatic amines, or such aliphatic amines as contain hydroxyl groups, or of salts or derivatives of the same.

Such aliphatic-hydroaromatic amines as contain hydroxyl groups are, inter alia, particularly suitable, as for example, cyclohexylethanolamine, cyclohexyldiethanolamine and homologues thereof. Substances of this kind possess especially the property of facilitating the plastification and clarification of casein to an extraordinary degree. These properties are manifested even at ordinary temperature, if moistened casein be intimately mixed for example with a small percentage of cyclohexylethanolamine; thereby the conversion of the casein into a plastic can be obtained under comparatively low pressure and at moderate temperature.

The acyl derivatives of the beforementioned amines, such as formyl or acetyl-compounds, for example, formylethanolamines as are obtained by the action of ethylene oxid on formamide, are also applicable for the purpose required. In many instances, salts of the said amines, such as carbonates, acetates and lactates, are also applicable with advantage, cyclohexylamineacetate for example, forming a suitable agent.

Many of the specified amines, their salts and derivatives such as acyl compounds, are soluble in water, a feature which greatly facilitates their application for the purposes of this invention.

The following example will further illustrate the nature of the said invention which however is not limited thereto.

*Example*

Moistened casein is treated with a small percentage of cyclohexylmonoethanolamine, the mass being intimately mixed. The further treatment is effected by moderately heating under pressure in any known or suitable manner, and an excellent artificial horn is obtained.

The cyclohexylmonoethanolamine may also be replaced by diethanolcyclohexylamine, or by a mixture of these two products or by their salts or acyl compounds.

We claim:

1. As new articles of manufacture, highly transparent artificial masses comprising casein and a hydroxylated isocyclic aliphatic-hydroaromatic amine.

2. As a new article of manufacture, a highly transparent artificial mass comprising casein and cyclohexylethanol-amine.

3. As new articles of manufacture highly transparent artificial masses comprising casein and an amine selected from the group consisting of hydroxylated aliphatic-hydroaromatic amines and the salts thereof.

In testimony whereof we have hereunto set our hands.

OTTO SCHMIDT.
KARL SEYDEL.
EGON MEYER.